US009256692B2

(12) United States Patent
Rajaram et al.

(10) Patent No.: US 9,256,692 B2
(45) Date of Patent: Feb. 9, 2016

(54) CLICKSTREAMS AND WEBSITE CLASSIFICATION

(75) Inventors: Shyam Sundar Rajaram, Mountain View, CA (US); Martin B Scholz, San Francisco, CA (US); Rajan Lukose, Oakland, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1471 days.

(21) Appl. No.: 12/629,907

(22) Filed: Dec. 3, 2009

(65) Prior Publication Data

US 2011/0137904 A1  Jun. 9, 2011

(51) Int. Cl.
*G06F 17/30* (2006.01)
*G06Q 30/02* (2012.01)

(52) U.S. Cl.
CPC ...... *G06F 17/30876* (2013.01); *G06F 17/3071* (2013.01); *G06F 17/30705* (2013.01); *G06Q 30/02* (2013.01)

(58) Field of Classification Search
CPC .............................................. G06F 17/30705
USPC .......... 707/722, 737, 748, 752, 754, 755, 758
See application file for complete search history.

(56) References Cited

U.S. PATENT DOCUMENTS

| | | | |
|---|---|---|---|
| 6,839,680 B1 | 1/2005 | Liu et al. | |
| 2003/0101449 A1 | 5/2003 | Bentolila et al. | |
| 2004/0172389 A1* | 9/2004 | Galai et al. | 707/3 |
| 2005/0216454 A1* | 9/2005 | Diab et al. | 707/3 |
| 2006/0041553 A1* | 2/2006 | Paczkowski et al. | 707/7 |
| 2007/0011020 A1* | 1/2007 | Martin | 705/1 |
| 2008/0022305 A1* | 1/2008 | Thompson | 725/39 |
| 2008/0126176 A1 | 5/2008 | Iguchi | |
| 2008/0215416 A1* | 9/2008 | Ismalon | 705/10 |
| 2009/0164502 A1* | 6/2009 | Dasgupta et al. | 707/102 |
| 2009/0192984 A1* | 7/2009 | Abrams et al. | 707/3 |
| 2009/0240569 A1* | 9/2009 | Ramer et al. | 705/10 |
| 2010/0076994 A1* | 3/2010 | Soroca et al. | 707/769 |
| 2010/0161642 A1* | 6/2010 | Chen et al. | 707/759 |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.

(Continued)

*Primary Examiner* — Mohammad S Rostami
(74) *Attorney, Agent, or Firm* — Hewlett Packard Enterprise Patent Department

(57) ABSTRACT

One embodiment is a method that receives a seed Uniform Resource Locator (URL) that represents a category for website classification. Clickstream data generated from the seed URL and additional URLs are analyzed to determine whether the additional URLs belong to the category. The method selects one or more of the additional URLs to represent the category.

20 Claims, 3 Drawing Sheets

(56) References Cited

OTHER PUBLICATIONS

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking," 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

\* cited by examiner

CLICKSTREAMS AND WEBSITE CLASSIFICATION

CROSS-REFERENCE TO RELATED APPLICATIONS

This patent application is related to U.S. patent application entitled "Method and System for Characterizing Web Content" filed on 31 Jul. 2009 and having Ser. No. 12/533,717, which is incorporated herein by reference.

BACKGROUND

Accurately classifying websites assists with many web-related tasks. For example, a prominent task is to roughly understand the content of websites, e.g., which broad topic is covered by a blog, which website is an online store, which website provides information on a specific topic, etc.

Standard text classification approaches require sets of labeled, representative examples for websites. These approaches are too intensive for many applications to execute efficiently, and for dynamically changing topics (like "top news") it is difficult to keep classifiers up to date. Moreover, many web pages cannot well be analyzed with traditional text classification techniques because of the proliferation of video news and flash animations.

DETAILED DESCRIPTION

Example embodiments relate to systems, methods, and apparatus that use clickstream data to track users to websites and classify and categorize content of the websites. Websites are identified that belong to a fixed set of given classes or categories. The clickstream data is used to identify which set of users visited which websites. This data is also used to classify the websites into a selected category.

Users generally navigate to and through websites to pursue personal interests, obtain information, and purchase products and services. Users with common interests tend to visit similar or related websites in a non-random or ordered fashion. For example, visits to websites are often guided by personal interests of the users, and users with similar interests will tend to navigate to related websites. Thus, the mere fact that a specific user visited a site is a "semantic" tag on that site.

Example embodiments discover these semantic tags using clickstream data to classify or categorize websites. After discovering a relatively large number of such tags and corresponding users, one embodiment follows them through the internet to obtain the clickstream data for classifying the websites. This clickstream data is generated as users click through the internet or World Wide Web (web), follow hyperlinks, and navigate to new web pages. Example embodiments analyze the clickstream data to discover websites that are linked or related to a particular or common interest, idea, or category.

In one embodiment, visitors to websites are tracked to classify content of the website. This classification occurs without examining or reviewing the actual content of the websites. In other words, example embodiments are able to classify websites without reviewing or considering the content (e.g., text and images presented or displayed at web pages of the websites) appearing at the website.

Instead, classification of the websites occurs with clickstream data that is generated as groups of users navigate across the internet or web.

Figure 1:
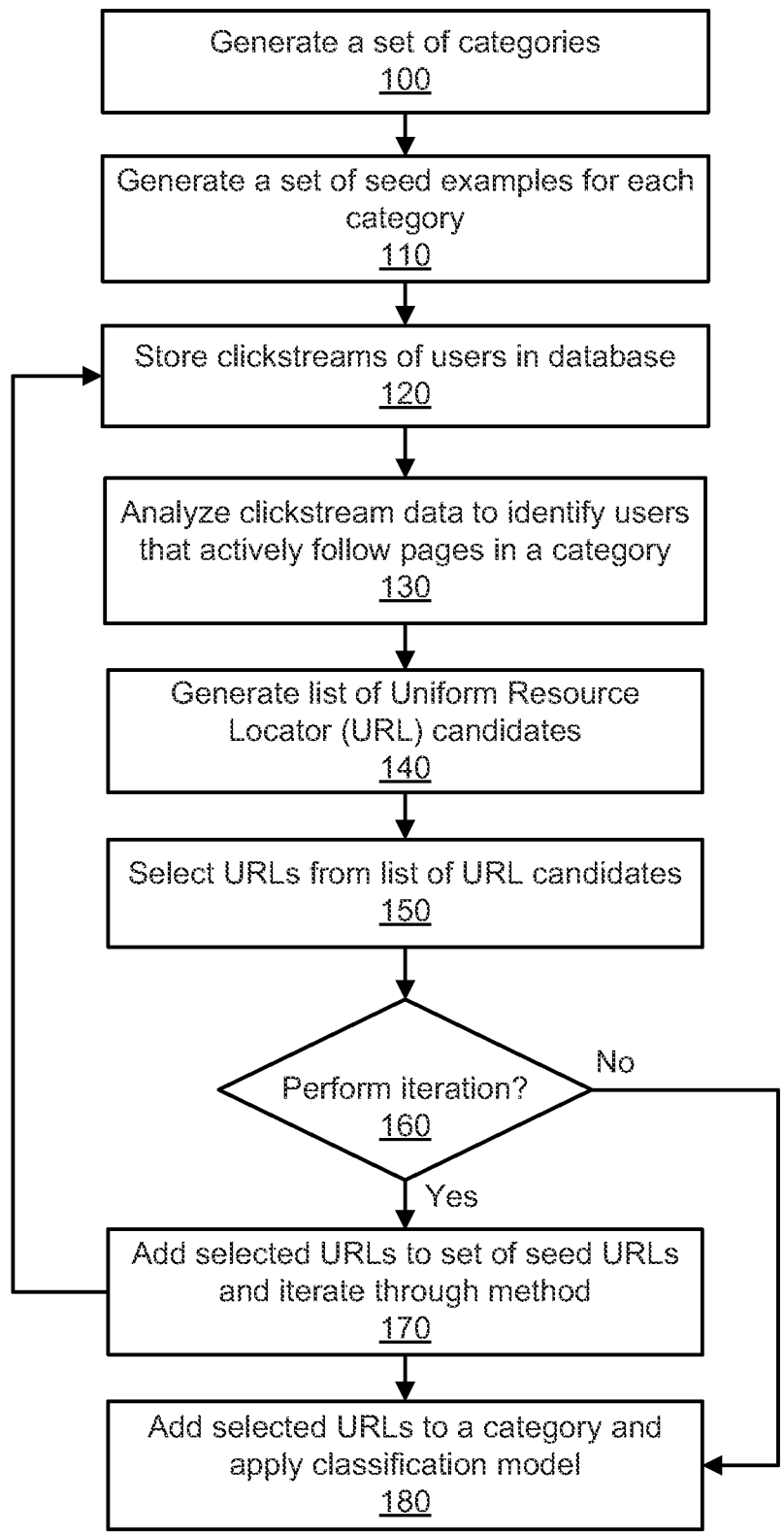
FIG. 1 shows a method for tracking users to websites to classify content of the websites in accordance with an example embodiment.

FIG. 1 shows a method for tracking users to websites to classify content of the websites in accordance with an example embodiment. Clickstream data is used for website classification.

As used herein and in the claims, "website classification" or "classifying websites" and the like refers to the organization of content of websites into different categories so the websites can be identified, discovered, and categorized. At a high level, classification of a website expresses a purpose or nature of business of the website. For example, classification assists in determining what products or services are being offered, what customers or users are being targeted, what information is being presented, etc.

As used herein and in the claims, a "clickstream" is a recording of what a computer user clicks on while web browsing or using a software application. As the user clicks on the webpage or application, the action is logged or stored in a client machine, a server, or a web browser. Clickstream data is the data generated from the clickstream.

Figure 2:
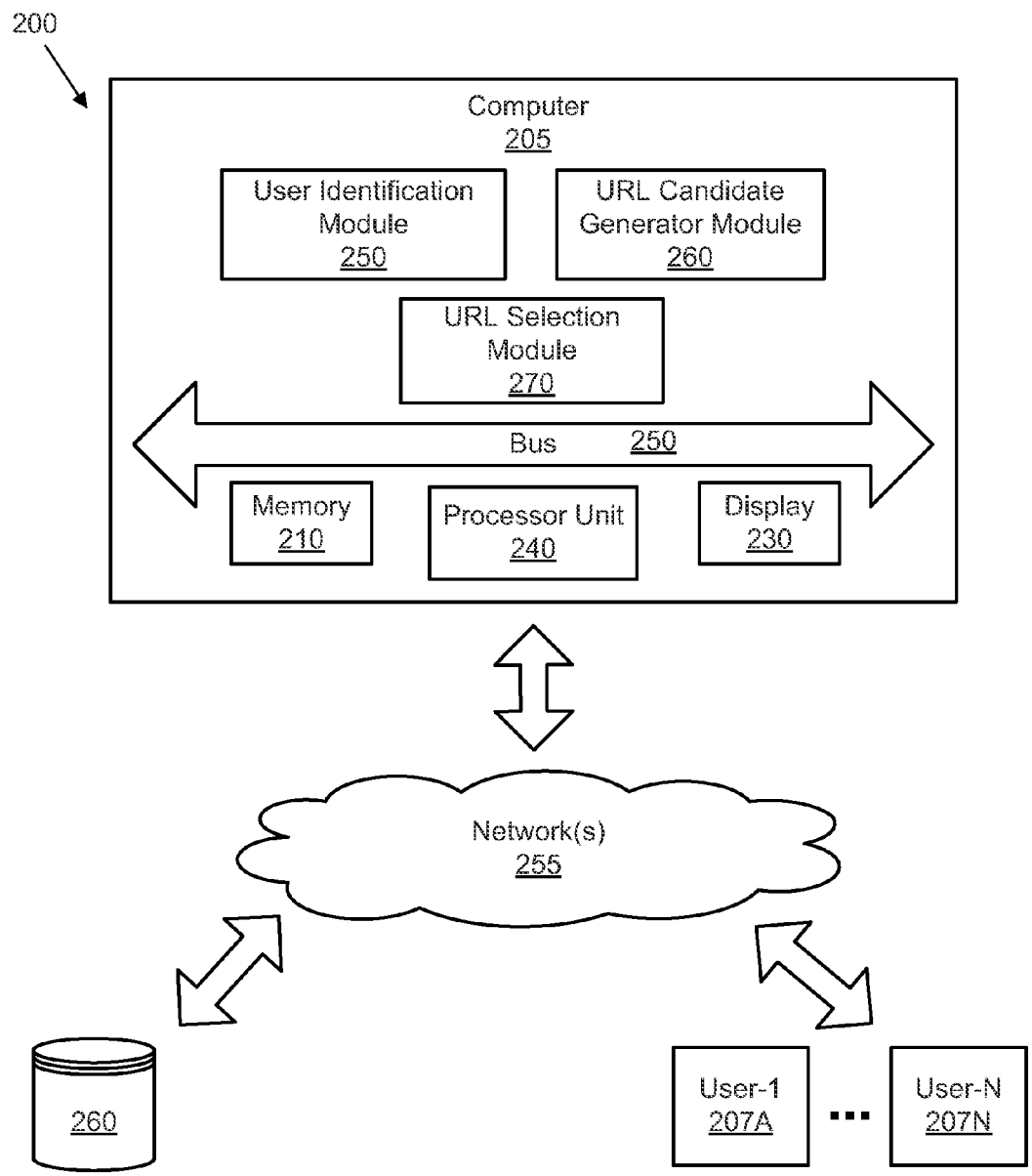
FIG. 2 shows a computer system for executing website classification methods in accordance with an example embodiment.

FIG. 2 shows a computer system 200 that executes methods described herein, including one more of the blocks illustrated in FIG. 1.

The computer system 200 includes a plurality of users 207A-207N and one or more databases or storage devices 260 coupled to computer 205 through one or more networks 255 (such as the internet or web). By way of example, the computer 205 includes memory 210, display 230, processing unit 240, one or more buses 250, and a plurality of modules 250, 260, and 270. The processor unit includes a processor (such as a central processing unit, CPU, microprocessor, application-specific integrated circuit (ASIC), etc.) for controlling the overall operation of memory 210 (such as random access memory (RAM) for temporary data storage, read only memory (ROM) for permanent data storage, and firmware) and executing the modules. The processing unit 240 communicates with memory 210 and modules via one or more buses 250 and performs operations and tasks necessary for executing the modules. The memory 210, for example, stores applications, data, programs, algorithms (including software to implement or assist in implementing embodiments in accordance with the present invention) and other data.

FIGS. 1 and 2 are discussed together.

According to block 100, a set of categories is generated, defined, or received. These categories are used to classify groups of related websites. As used herein and in the claims, a "category" is a distinct class to which an entity or concept belongs. Categories are divisions within a system of classification.

Example embodiments are not limited to any number or type of categories. For example, a single category can be established or multiple different or related categories established, such as hundreds or thousands of categories. The set of categories can include any topic or information presented at websites, such as those presented on the internet or other networks. This information ranges from broad or general topics (such as the design of computer-based information systems) to more specific topics (such as classifying pages that serve specific interests like fashion design, Linux development, or automatic blacklisting of adult content).

According to block 110, a set of seed examples is generated for each category. These seeds can be the domain part of popular or well-known URLs in a field associated with a general category (such as hp.com or linux.com). The URLs can also be more specific, for example in instances where the category itself is more specific as opposed to more general (such as shopping.hp.com/scanner or a website related to Linux development for mobile phones).

In one embodiment, the seeds of URLs are obtained with assistance from a search engine. A topic or category is entered into an internet search engine to retrieve a list of common or popular URLs relating to the query. In another embodiment, the seed URLs are generated by a computer or by a human and input into or provided to a computer.

According to block 120, clickstream data of users are stored in a database or other storage device. For example, clickstream data from users 207A-207N is stored in database 260.

As users click to and through websites, the clickstream data associated with each particular user is captured and stored. By way of example, this data can include the URL, a timestamp (i.e., a date and time when the click occurred), and a unique identification of the user performing the click.

According to block 130, users that most actively follow pages in a category are identified by analyzing the clickstream data. For example, user identification module 250 generates or determines users that most actively follow websites in a category.

Not every user that clicks and navigates to a website in a category is treated as an active user or classifier for that website. In one embodiment, for example, only a subset of all users is interested in each of the categories being tracked (i.e., categories from the set of seed categories). This subset of users is identified by matching the seed URLs (part of the input) to the clickstreams of all users.

In one example embodiment, most active users are identified by examining a number of page clicks at a website or a length of time spent at the website. For example, if user A performs 15 clicks at a website and user B performs 1 or 2 clicks at the website, then user A is deemed to have a higher interest at the website than user B. Likewise, if user A spends 30 minutes or an hour at the website and user B spends less than one minute at the website, then user A deemed to have a higher interest at the website than user B.

Furthermore, the number of clicks at a website or the time spent at a website can be compared to an average for all users who visit the site. For example, if user A performs 15 clicks at the website and the average of all users perform 6 clicks at the website, then user A is deemed a more active user. Likewise, if user A spends 30 minutes at the website and average of all users spend 7 minutes at the website, then user A is deemed a more active user.

According to block 140, a list of URL candidates is generated based on the activity identified in block 130. For example, URL candidate generator module 260 generates the list of URL candidates.

For each category, one embodiment identifies and stores the URLs that were also visited by the selected set of most active users.

By way of example, assume a specific seed URL on the internet is provided for the category of Linux development for mobile telephones. Users who visit this website will also visit over website that relate to Linux development for mobile telephones. These additional websites become candidates that may be added to the category.

Example embodiments are not limited to a specific number of seed URLs that are initially used. For instance, a single seed URL or a plurality of URLs can be used to represent or define the category. Thus, one or more seed URLs can be used to discover other related URLs and build the list of candidate URLs.

According to block 150, URLs are selected from the list of URLs generated in block 140. For example, URL selection module 270 selects URLs from the list of URLs.

Selection of URLs occurs at a particular granularity level. For example, URLs can be tracked at different granularity levels (i.e., different levels of the URL path). One embodiment tracks URLs at all levels of the URL path. For example, the following URL:

http://blog.wired.com/business/2008/10/googles-mail-
       go.html is counted as all of the following paths:
       blog.wired.com/business/2008/10/googles-mail-
          go.html
       blog.wired.com/business/2008/10/
       blog.wired.com/business/2008/
       blog.wired.com/business/
       blog.wired.com
       wired.com
       com.

For each of these URLs, one embodiment computes their frequency in the overall clickstream data and establishes a null hypothesis that the subset of target users visited the URL at random. In other words, each URL is counted once as part of the frequency computation. If this hypothesis can be rejected because the total number of visits is too high, then the fact that the target users have only their interest in the target concept in common is a strong indicator that the website is part of the target category.

Standard significance tests as well as other metrics commonly used in Machine Learning can be used to select from the set of URLs generated in block 140. For example, confidence scores can be calculated for each of the URLs to determine whether to add the URL to the list of URLs for the given category.

One embodiment performs an iteration of the method. According to block 160, if iteration is desired, flow proceeds to block 170. If iteration is not desired, then flow proceeds to block 180, and the selected URLs are iteratively added to one of the categories generated in block 100 and the classification model is applied. As URLs are added to the category, users can be discovered and added as belong to the category. In one embodiment, users are iteratively added as URLs are also iteratively added.

According to block 170, the selected URLs are added to the seed URLs generated in block 110. Flow proceeds back to block 120, and the method is iterated again. This iteration increases the information available for picking the right users to track, and improves the overall approach gradually.

According to block 180, the categories and website classification can be applied to various models, including both static and dynamic model uses.

In the static case, URLs selected in block 180 are stored as positive examples and used for table lookups whenever desired. By way of example, assume a category is a URL blacklist for adult content. In the case of blacklists, "positive" examples are blocked URLs, and "negative" examples are allowed URLs. The lists would be distributed to servers or end-user PCs, for example.

In the dynamic case, an accumulated number of joint visits of target users for different concepts are continuously tracked. New pages that are jointly visited by multiple users of the group are added to the list if they pass a test (i.e., have an appropriate granularity level) according to block 150. Analogously, previously added sites can be removed if they are no longer supported by the group.

At a lower time scale, individual users that no longer satisfy the criterion under block 130 can be replaced dynamically by running another full iteration of the method.

Example embodiments are applicable to a wide range of uses that implement website classification. One embodiment uses the method to computer user profiles. As used herein and in the claims, a "user profile" is a collection of personal data that provides a representation of an identity of a specific user or a description of characteristics of a person. User profiles can be used by adaptive hypermedia systems that personalize interaction between the user and computers, dynamic websites, target advertisement, online social networking, modifications to applications and operating systems tailored to a user, etc.

The method of FIG. 1 enables classification of websites without analyzing, reviewing, or even considering content presented at web pages of the websites. The method can be executed with websites that include video-streams, dynamic javascript, etc. Even if most of the URL is a session ID (i.e., more than 50%), the part of the URL right above the session ID can still be discovered. Furthermore, once a user base for each topic has been established, the method can detect new sites quickly (e.g., in real-time) and without retraining a model. Further yet, as interests of users change, different clickstream data is detected, and the categories are updated to reflect changes to these new user interests.

Example embodiments establish a list of categories and determine which websites belong to which categories. In one embodiment, an Internet Service Provider (ISP) tracks which websites users are visiting. This information (in the form of clickstream data) can be obtained; provided, or bought. A user profile can be developed for users toward the different categories.

Instead of reviewing content at the website for classification, example embodiments leverage the fact that many users navigating and browsing through the internet portray common characteristics or behavior that can be used for website classification. Although different users have different interests, a large enough sample of users and related clickstream data show common characteristics and behavior between sets of users. This information is useful to determine to which websites users in a common group navigate and how long do these users typically stay at such websites.

Figure 3:
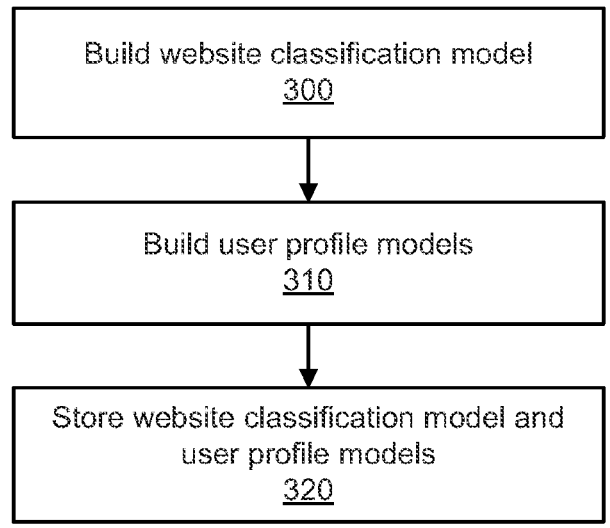
FIG. 3 shows a method for building a web classification model and user profiles models in accordance with an example embodiment.
Figure 4:
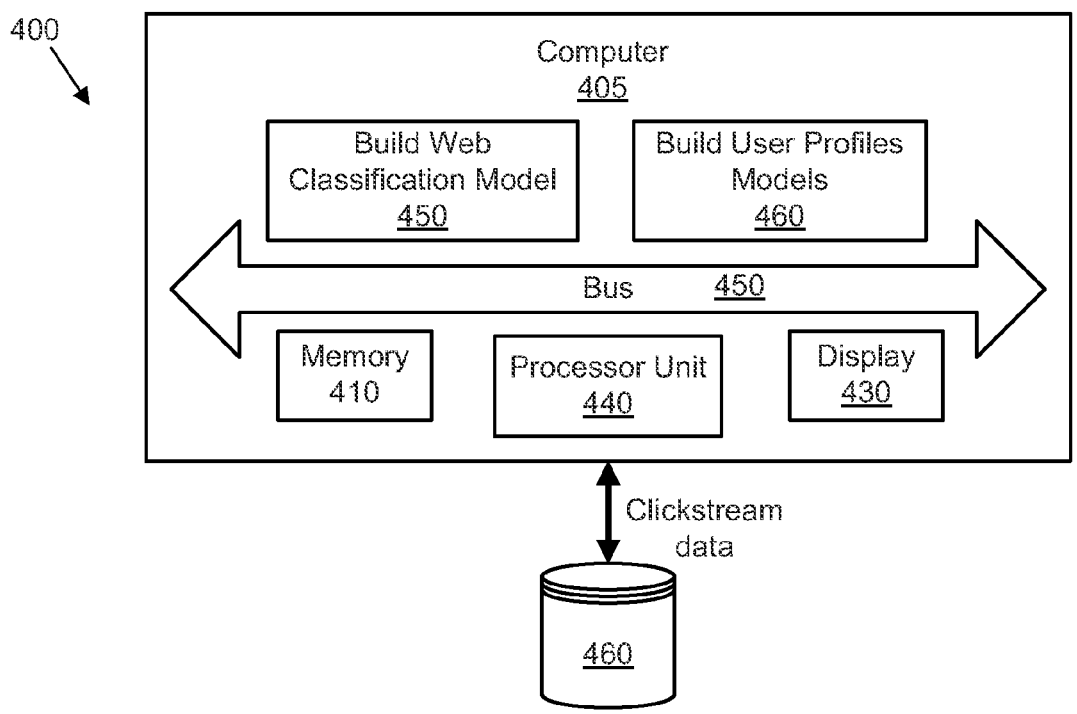
FIG. 4 shows a computer system for building the web classification model and the user profiles models in accordance with an example embodiment.

FIG. 3 shows a method for building a web classification model and user profile models in accordance with an example embodiment. FIG. 4 shows a computer system 400 for executing the method of FIG. 3

The computer system 400 includes a computer 405 in communication with a database or storage device 460 that stores clickstream data. By way of example, the computer 405 includes memory 410, display 430, processing unit 440, one or more buses 450, and a plurality of models 450 and 460. The processor unit includes a processor (such as a central processing unit, CPU, microprocessor, application-specific integrated circuit (ASIC), etc.) for controlling the overall operation of memory 410 (such as random access memory (RAM) for temporary data storage, read only memory (ROM) for permanent data storage, and firmware) and building the models. The processing unit 440 communicates with memory 410 and models via one or more buses 450 and performs operations and tasks necessary for executing and building the models. The memory 410, for example, stores applications, data, programs, algorithms (including software to implement or assist in implementing embodiments in accordance with the present invention) and other data.

FIGS. 3 and 4 are discussed together.

According to block 300, a website classification model is built. For example, computer 405 includes a web classification model 450 to build or assist in building the web classifications. As explained in conjunction with FIGS. 1 and 2, the model can include one or more of a user identification module 250, a URL candidate generator module 260, and a URL selection module 270 (shown in FIG. 2).

According to block 310, user profiles models are built for the users. For example, computer 405 includes a user profiles model 460 to build or assist in building the user profiles.

According to block 320, the web classification model and user profile model are stored in memory. For example, these models are stored in computer 405 and/or a tangible or physical computer readable medium, such as RAM memory, a hard drive, CD, etc.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible computer-readable media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   receiving a seed Uniform Resource Locator (URL) that represents a category for website classification;
   analyzing clickstream data generated from the seed URL and additional URLs to determine whether the additional URLs belong to the category; and
   electing one or more of the additional URLs to represent the category.

2. The method of claim 1 further comprising: building a website classification model based on the seed URL and additional URLs, the website classification model being executable to analyze the clickstream data and determine whether URLs belong to the category.

3. The method of claim 1 further comprising: analyzing a number of clicks that a user performs at each of the additional URLs to determine whether the additional URLs are related to the seed URL and represent the category.

4. The method of claim 1 further comprising: analyzing an amount of time that users spend at each of the additional URLs to determine whether the additional URLs are related to the seed URL and represent the category.

5. The method of claim 1, wherein the clickstream data includes at least one of a record of each URL visited, a timestamp when the URL is visited, or a unique identification for each user.

6. The method of claim 1 further comprising:
   iteratively adding more URLs to the category; and
   iteratively discovering users who belong to the category.

7. The method of claim 1 further comprising: tracking clickstreams of a user to generate a candidate list of URLs to represent the category, wherein the candidate list of URLs includes the additional URLs.

8. A method executed by a computer, comprising:
   building a website classification model that uses a seed Uniform Resource Locator (URL) to represent a category and analyzes clickstreams navigating to the seed URL and additional URLs to determine whether the additional URLs belong to the category.

9. The method of claim 8 further comprising: building user profile models from the clickstreams.

10. The method of claim 8, wherein the website classification model tracks a plurality of levels of a URL path for each of the additional URLs.

11. The method of claim 8, wherein the website classification model computes a frequency of clicks of the additional URLs in the clickstreams to determine if the additional URLs belong to the category.

12. The method of claim 8 wherein the website classification model selects one of the additional URLs as a second seed URL and analyzes the clickstream to determine which of the additional URLs relate to both the seed and second URLs and represent the category.

13. The method of claim 8, wherein the website classification model determines whether the additional URLs belong to the category without reviewing text or images presented at web pages of the additional URLs.

14. The method of claim 8, wherein the clickstreams are generated as the users click to the seed URL and the additional URLs.

15. A tangible computer-readable medium having instructions for causing a computer to execute a method, comprising:
   obtaining a seed Uniform Resource Locator (URL) that represents a category for website classification;
   analyzing clickstreams that navigate to the seed URL and additional URLs to determine which of the additional URLs belong to the category; and
   generate, from the additional URLs, a list of URLs that represent the category.

16. The tangible computer-readable medium of claim 15 further comprising: building, from the list of URLs, user profiles.

17. The tangible computer-readable medium of claim 15 further comprising: updating the list of URLs to reflect new interests of a user based on changes to the clickstreams of the user.

18. The tangible computer-readable medium of claim 15 further comprising: applying the list of URLs to provide target advertising to a user.

19. The tangible computer-readable medium of claim 15 further comprising: determining an average number of clicks a user performs at the additional URLs to determine which of the additional URLs belong to the category.

20. The tangible computer-readable medium of claim 15 further comprising: matching the seed URL with the clickstreams to determine which of the additional URLs belong to the category.

* * * * *